S. M. POFF.
Coffee-Roaster.
No. 221,607.        Patented Nov. 11, 1879.
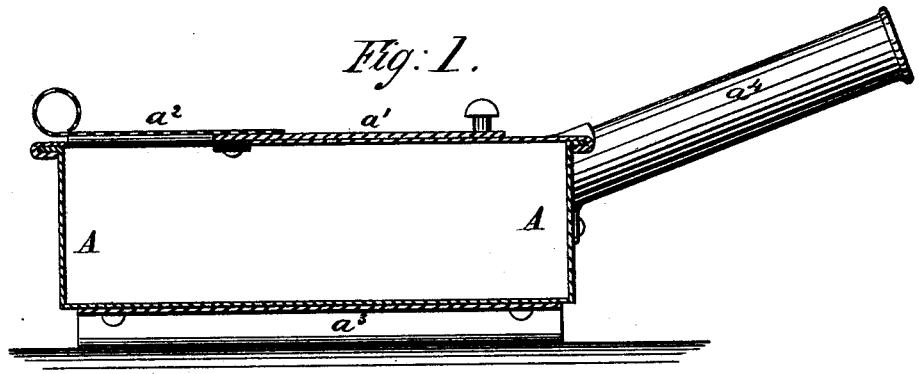
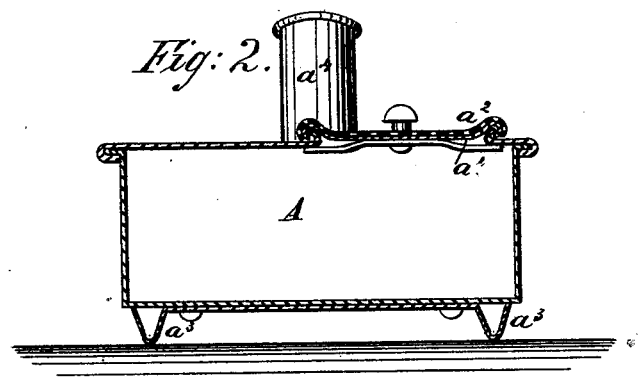
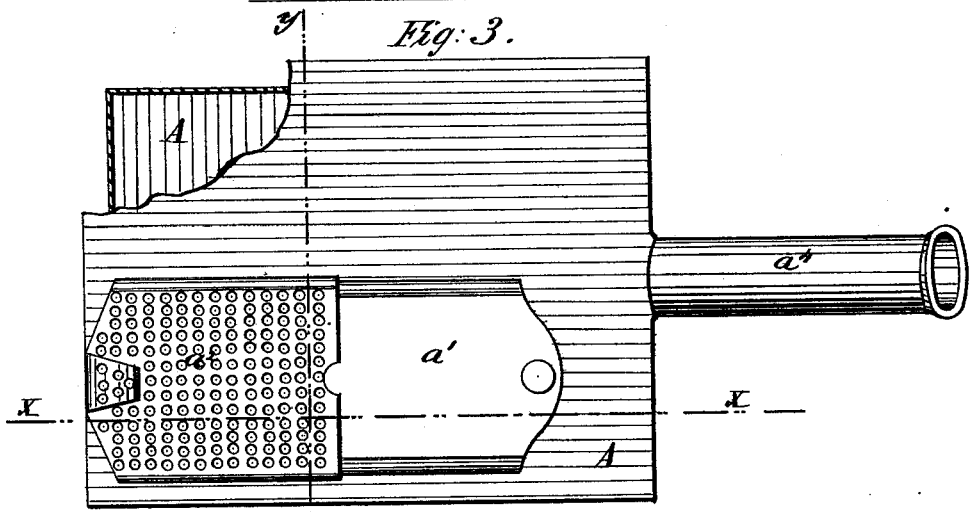
WITNESSES:
Achilles Sehehl.
C. Sedgwick
INVENTOR:
S. M. Poff
BY Munn & Co
ATTORNEYS.

UNITED STATES PATENT OFFICE.

STEPHEN M. POFF, OF OMAHA, NEBRASKA.

IMPROVEMENT IN COFFEE-ROASTERS.

Specification forming part of Letters Patent No. 221,607, dated November 11, 1879; application filed June 11, 1879.

*To all whom it may concern:*

Be it known that I, STEPHEN MULFORD POFF, of Omaha, in the county of Douglas and State of Nebraska, have invented a new Improvement in Coffee-Browner, Corn-Popper, &c., of which the following is a specification.

Figure 1 is a vertical longitudinal section of my improved device, taken through the line $x\ x$, Fig. 3. Fig. 2 is a vertical cross-section of the same, taken through the line $y\ y$, Fig. 3. Fig. 3 is a top view of the same, part being broken away to show the construction.

Similar letters of reference indicate corresponding parts.

The object of this invention is to furnish an improved implement for browning coffee, popping corn, and roasting peanuts, which shall be simple in construction and convenient in use.

The invention consists in the pan made with a close top, having a hole in its top closed with a close cover, and a perforated cover having ribs or flanges upon its bottom and a handle attached to its rear end, as hereinafter fully described.

A is a wide shallow pan, made of sheet metal, and having its top seamed to its sides and ends, so as to be air tight, or nearly so. In the top of the pan A, near one of its forward corners, is formed a small opening, through which the substance to be browned, popped, or roasted is inserted and removed, and which is provided with a close sliding cover, $a'$, to be used when coffee is being browned to prevent the aroma from escaping from the coffee, thus producing a stronger and more palatable coffee than when browned in the usual way.

The opening in the top of the pan A is also provided with a perforated cover, $a^2$, to be used when popping corn and roasting peanuts, to allow the air to pass in and out freely.

The cover $a'$ slides upon flanges formed upon or attached to the top of the pan A at the edges of the opening through it. The perforated cover $a^2$ slides upon the edges of the close cover $a'$.

Upon the bottom of the pan A are formed, or to it are attached, longitudinal ribs or flanges $a^3$, to keep the said bottom of the pan from coming in contact with the top of the stove or the bottom of the oven upon which the said pan is placed to be heated, and thus prevent the said bottom from becoming too hot and burning the substance within the pan.

To the rear end of the pan A is attached a handle, $a^4$, for convenience in handling it.

When coffee is to be browned the proper amount of coffee is put into the pan A, the cover $a'$ is closed, and the pan is set upon the bottom of a stove-oven or baking-oven. After the pan gets hot it is occasionally taken out and shaken, or shaken within the oven, so that the coffee may be browned evenly.

When corn is to be popped or peanuts roasted the corn or peanuts are put into the pan A, the perforated cover $a^2$ is closed, and the pan is placed upon the top of a stove or the bottom of an oven, and is occasionally taken up and shaken to insure the even heating of the corn or peanuts.

The pan being wide and shallow, the coffee or other substance has a large surface for the heat to operate upon.

Having thus described my invention, I claim as new and desire to secure by Letters Patent—

The pan A, having its top seamed to its sides and provided with an opening in the said top, closed by the cover $a'$ and the perforated cover $a^2$, ribs or flanges $a^3$, formed upon its bottom, and a handle, $a^4$, attached to its rear end, substantially as herein shown and described.

STEPHEN MULFORD POFF.

Witnesses:
A. H. POFF,
H. A. STURGES.